United States Patent
Turjeman et al.

(10) Patent No.: US 11,535,190 B2
(45) Date of Patent: Dec. 27, 2022

(54) VEHICLE OCCUPANT RESTRAINT SYSTEM

(71) Applicants: Dana Hikri Simon, Gan Yavne (IL);
Refael Hikri Simon, Gan Yavne (IL);
Geva Hikri Simon, Gan Yavne (IL);
Hili Hikri Simon, Gan Yavne (IL); Ori Hikri Simon, Gan Yavne (IL); Danniel Turjeman, Pardes Hanna-Karkur (IL)

(72) Inventors: Danniel Turjeman, Pardes Hanna-Karkur (IL); Ofir Hikri Simon, Gan Yavne (IL)

(73) Assignees: Dana Hikri Simon, Gan Yavne (IL);
Refael Hikri Simon, Gan Yavne (IL);
Geva Hikri Simon, Gan Yavne (IL);
Hili Hikri Simon, Gan Yavne (IL); Ori Hikri Simon, Gan Yavne (IL); Danniel Turjeman, Pardes Hanna-Karkur (IL)

( * ) Notice: Subject to any disclaimer, the term of this patent is extended or adjusted under 35 U.S.C. 154(b) by 54 days.

(21) Appl. No.: 16/765,080

(22) PCT Filed: Nov. 22, 2018

(86) PCT No.: PCT/IL2018/051271
§ 371 (c)(1),
(2) Date: May 18, 2020

(87) PCT Pub. No.: WO2019/102470
PCT Pub. Date: May 31, 2019

(65) Prior Publication Data
US 2020/0353891 A1    Nov. 12, 2020

(30) Foreign Application Priority Data
Nov. 22, 2017   (IL) .......................................... 255869

(51) Int. Cl.
*B60R 22/14*    (2006.01)
*A62B 35/00*    (2006.01)
(Continued)

(52) U.S. Cl.
CPC .......... *B60R 22/14* (2013.01); *A62B 35/0018* (2013.01); *B60N 2/265* (2013.01); *B60R 22/105* (2013.01); *B60R 22/30* (2013.01)

(58) Field of Classification Search
CPC ................. B60R 22/105; B60R 22/14; B60R 2021/0044; B60R 22/30; B60R 22/024; B60N 2/265; A62B 35/0018
(Continued)

(56) References Cited

U.S. PATENT DOCUMENTS 4,927,211 A    5/1990  Bolcerek
5,161,258 A   11/1992  Coltrain
(Continued)

FOREIGN PATENT DOCUMENTS

CN    104627039 A   5/2015
EP      1690754 B8   5/2011
(Continued)

OTHER PUBLICATIONS

"Adjustable Baby Car Seat For 6 Months-5 Years Old Baby, Safe Toddler Booster Seat, Child Car Seats Potable Baby Chair In The Car", https://www.aliexpress.com/item/Adjustable-Baby-Car-Seat-For-6-Months-5-Years-Old-Baby-Safe-Toddler-Booster-Seat-Child/, last accessed Jul. 29, 2020, 2 pages.

*Primary Examiner* — David R Dunn
*Assistant Examiner* — Tania Abraham
(74) *Attorney, Agent, or Firm* — Dorsey & Whitney LLP (57) ABSTRACT

An occupant restrainment harness configured for use in conjunction with a vehicle seatbelt system, the restrainment harness having a back panel and a front panel defining
(Continued)

together an occupant torso accommodating space, adjustably closable by a fastener mechanism configured at the front panel; wherein the back panel is configured at a lower portion thereof with a lap strap fastener arrangement configured for receiving a lap strap of the vehicle seatbelt system, and a top shoulder strap fastener buckle centrally positioned at a top portion of the back panel.

17 Claims, 12 Drawing Sheets

(51) Int. Cl.
    *B60N 2/26*     (2006.01)
    *B60R 22/10*     (2006.01)
    *B60R 22/30*     (2006.01)

(58) Field of Classification Search
    USPC .......................................................... 297/465
    See application file for complete search history.

(56) References Cited

U.S. PATENT DOCUMENTS

| | | | |
|---|---|---|---|
| 6,314,578 B1 * | 11/2001 | Masuda | ............... B60N 2/2803 |
| | | | 2/102 |
| 7,131,703 B1 | 11/2006 | Sheridan et al. | |
| 2012/0217786 A1 | 8/2012 | Kim | |

FOREIGN PATENT DOCUMENTS

| | | | | |
|---|---|---|---|---|
| GB | 2441734 A | * | 3/2008 | ........... B60N 2/2884 |
| JP | H08183424 A | | 7/1996 | |
| JP | 2001151074 A | | 6/2001 | |
| JP | 2001158323 A | | 6/2001 | |
| KR | 20030056764 A | * | 7/2003 | |
| KR | 20030056764 A | | 7/2003 | |
| WO | 0046080 A1 | | 8/2000 | |
| WO | 2016156839 A1 | | 10/2016 | |

* cited by examiner

VEHICLE OCCUPANT RESTRAINT SYSTEM

TECHNOLOGICAL FIELD

The present disclosure is concerned with a vehicle occupant restraint system, a harness for use in conjunction with a vehicle seatbelt system.

BACKGROUND ART

References considered to be relevant as background to the presently disclosed subject matter are listed below:
U.S. Pat. No. 5,161,258
U.S. Pat. No. 7,131,703
US2012/0217786

Acknowledgement of the above references herein is not to be inferred as meaning that these are in any way relevant to the patentability of the presently disclosed subject matter.

BACKGROUND

U.S. Pat. No. 5,161,258 discloses a child is adapted to be zipped into a sleeveless vest which coacts with the lap and shoulder belts of a vehicle safety harness to restrain the child in the vehicle. The back side of the vest includes a generally horizontal loop for receiving the lap belt and further includes a vertically inclined loop for receiving the shoulder belt. Both loops are adapted to be opened and closed by zippers in order to enable the belts to be easily placed into and removed from the loops.

U.S. Pat. No. 5,429,418 discloses a safety restraint system having a body component including a head opening for insertion over the head of a child and a belt which buckles around the lower rib cage of the child to secure the safety restraint system on the child. The safety restraint system can thus be secured to the child prior to the child entering the vehicle. A first strap member is secured to a lower portion of the body component. This first strap is wrapped over a vehicle lap belt until an engaging member having fabric hook elements engages fabric loop elements on a receiving member affixed to the body component. A second strap is affixed to the body component just below the head opening. This strap is folded downward over the vehicle shoulder belt until fabric hook elements engage fabric loop elements on the reverse side of the engaging member on the first strap. The second strap positions the shoulder belt away from the head and neck of the child. This provides a safer restraint as well as a more comfortable situation for the child.

U.S. Pat. No. 7,131,703 discloses an apparatus for a safety vest for a portable restraining system designed to protect a child in the back seat of a taxi cab, limousine, or car should a child safety seat not be available or practical. The device provides means for separating a seat belt comprising a lap 18 and shoulder belt for either side of a left or right seated passenger, the means also insuring the continued separation of the belts during use; a first and second closure means comprising a zipper and a hook and loop fastening device that will prevent possible fouling of the zipper due to g-forces at occurring during an accident and a quick release which can be initiated by small children as opposed to mechanical locks that they may be unfamiliar with.

US2008/0252132 discloses a vehicle safety device in the form of a garment wearable on the torso of a person. The garment has a body section having a front portion and a back portion, the front portion having one or more loops or straps to which a car seat belt can be attached. The device also incorporates quick release mechanisms to allow it to be quickly and securely attached to a person and to be quickly removed in case of an emergency.

US2012/0217786 discloses a support device for a vehicle child seat belt tightens the shoulders and the abdominal area of a child using the existing vehicle seat belt as it is in a state where the vest type support device is easily worn on the body of the child, and which includes a cushion body for fastening the entire front face of the body of the child and an auxiliary belt for preventing the child from upwardly or downwardly escaping from the seat belt. The vehicle child seat belt support device includes: a shock-preventing cushion body formed to surround a child's body and having a seat belt receiving part formed on a front face thereof in such a fashion that the seat belt is detachably accommodated in the seat belt receiving part; and a separation-preventing auxiliary belt for supporting the back of the child so as to prevent the shock-preventing cushion body from being separated from the child's body, the separation-preventing auxiliary belt having an end joined to one side of an upper portion of the cushion body and the other end joined to one side of a lower portion of the cushion body.

General Description

The present disclosure is concerned with a restraint system for use in conjunction with a seatbelt system of a vehicle.

The term seatbelt as used herein the specification and claims denotes any type of seatbelt system used in a vehicle. Though 3-point seatbelts (known also as lap and sash seatbelts and Y-type seatbelts) have long been legislated in passenger cars, 2-point seatbelts (known also as lap seatbelts) are still used, e.g. in some public transportation vehicles, aircrafts, etc. The seatbelt system can be also of other types, e.g. harness-type seatbelts (at times referred to as 5 or 7 point seatbelts). The terms belt and strap can be interchangeably sued.

Whilst the presently disclosed system is in particular useful for restrainment of children, it can be used also for restraining older individuals, as well as pets. Thus, the term occupant as used herein the specification and claims denotes any individual or pet using the seatbelt system.

The term lap strap denotes a seatbelt portion configured for extending over a waist portion of a vehicle occupant.

A lap strap is fixedly anchored at one end to the vehicle and has an opposite end configured for engaging to the vehicle by a buckle. According to other configurations the lap strap comprises two segments each having an end fixedly anchored to the vehicle, with an interconnecting buckle coupling the two opposite ends.

The term shoulder strap denotes a seatbelt portion configured for diagonally extending over the torso of a vehicle occupant.

A shoulder strap can coextend from a lap strap through a loop buckle configured for engaging to a buckle anchored to the vehicle, with an opposite end articulated at an elevated location to the vehicle, often through a retractor mechanism. According to other configurations there are provided two shoulder straps articulated to the vehicle from an elevated location and extending downwards over a torso of the occupant, for buckling with a central buckling mechanism of a lap strap.

According to an aspect of the present disclosure there is provided an occupant restraint harness configured for use in conjunction with a vehicle seatbelt system, the restraint harness having a back panel and a front panel defining together an occupant torso accommodating space, adjustably closable by a fastener mechanism configured at the front panel; wherein the back panel is configured at a lower portion thereof, with a lap strap fastener arrangement configured for receiving a lap strap of the vehicle seatbelt system, and a top shoulder strap fastener buckle centrally positioned at a top portion of the back panel.

According to a particular arrangement, the top shoulder strap fastener buckle configured for fixed arresting a shoulder strap of the vehicle seatbelt system.

It is appreciated that the top shoulder strap fastener buckle is configured for fixing over the shoulder strap in a nonsliding fashion, however facilitating detaching from the shoulder strap for removing the occupant restraint harness from the vehicle.

According to a particular configuration the back panel can further be configured at a bottom portion thereof, with a bottom shoulder strap fastener buckle, extending substantially below the top shoulder strap fastener buckle. Said bottom shoulder strap fastener buckle can be a loop slidingly accommodating a respective portion of the shoulder strap, or it can fixedly engage therewith.

In use, the occupant restraint harness is fixed to the vehicle seatbelt system in such a way that the lap strap is engaged by the lap strap fastener arrangement and the shoulder strap is fixedly arrested by the top shoulder strap fastener buckle, thereby facilitating functional operation of the vehicle seatbelt system, namely facilitating tensioning and retraction of the shoulder strap as an occupant using the restraint harness displaces about a seat of the vehicle, i.e. forward movement of the occupant. However, at emergency situations, e.g. at the event of sudden deceleration, rollover, etc. the vehicle seatbelt system functions regularly, namely restrains forward displacement of the harness and the occupant.

Any one or more of the following features designs and configurations can be applied to an occupant restraint harness according to the present disclosure, separately or in various combinations thereof:

The occupant restraint harness can be functionally used regardless if the occupant is positioned over a seat of the vehicle, over a booster seat or a child seat;

The lap strap can be either fixedly arrested or slidably received by the lap strap fastener arrangement;

The lap strap fastener system can be one or more loop buckles, or sleeve-like portions extending across a bottom portion of the back panel, for slidably accommodating respective portions of the lap strap of the vehicle seatbelt system;

The lap strap fastener system can be configured with a closure arrangement, such as buckles, zipper fasteners, hook and loop/pile fasteners (Velcro®), etc. facilitating removable mounting over the respective portions of the lap strap of the vehicle seatbelt system;

The lap strap fastener system can be positioned at a waist portion of the back panel;

The lap strap fastener system can be configured with at least two closure arrangements, each disposed at a respective side portion of the back panel;

The lap strap fastener system can be configured with at least two equi-leveled closure arrangements;

The lap strap fastener system can be configured as a single continuous element extending across a substantive portion of the back panel;

The top shoulder strap fastener system is configured for fixedly though detachable articulation to the shoulder strap of the of the vehicle seatbelt system;

The height of the top shoulder strap fastener system can be easily adjusted over the back panel;

All fasteners at the back panel, are configured for attachable detachable fastening to the vehicle's seatbelt system, whereby the restraint harness can be readily removed and reattached thereto;

The restraint harness can be made of light weight, breathable, washable material;

The restraint harness can be configured with storage pockets/pouches;

The front panel and back panel of the restraint harness can be uniform;

The front panel and back panel of the restraint harness can be separate panels articulated to one another by side portions;

The front panel can comprise two or more restraint straps:

The front panel can comprise a waist strapping;

The occupant torso accommodating space is adjustable for accommodating occupants of different size and height;

The top shoulder strap fastener buckle can be any type of buckle, however configured such that it arrests the respective portion of the shoulder strap and will not spontaneously slide thereover, though configured for detachable arresting; for example, the top shoulder strap fastener buckle can be a clamp-type buckle;

The back panel can be a uniform panel or it can comprise several panels articulated to one another;

The back panel can comprise a waist panel and one or more shoulder panels articulated to one another;

The back panels can be displaceable with respect to one another so as to adjust to shoulder width, waist width and height of an occupant;

The shoulder panel of the back panel can be height-adjusted with respect to the waist panel by a telescopic mechanism configured for arresting by a height adjusting mechanism;

The height adjusting mechanism can be a tube clips fastener mechanism, an external locking clip, clamp lock, screw lock, etc.;

The height adjusting mechanism can comprise several rods with an manipulating mechanism common for all, i.e. wherein a single manipulating mechanism governs the height adjusting mechanism associated with each of the rods;

The height adjusting mechanism can be a setting arrangement configured for arresting back panel segments to one another at relative elevated positions.

According to one particular configuration the back panel comprises a shoulder pad and a waist pad displaceable with respect to one another and however configured for arresting at different elevation positions by a flexible system;

The top shoulder strap fastener buckle, and optionally the bottom shoulder strap fastener buckle, can articulate with one shoulder strap or with two shoulder straps The top shoulder strap fastener buckle together and the a lap strap fastener arrangement, are disposed at an isosceles triangle like configuration;

At the assembled position, the shoulder strap and the waist strap are retained by the harness at an inverted T-like shape;

The shoulder strap extends substantially vertical when arrested by the top shoulder strap fastener buckle and the bottom shoulder strap fastener buckle;

At least a portion of the harness panels is made of or comprises rigidified portions for providing an individual support and impact protection in case of accident, etc.;

The occupant restrainment harness can be mounted in a vehicle with the shoulder strap fully extended from a strap retractor mechanism of the vehicle, with the top shoulder strap fastener buckle arresting the shoulder strap, and the bottom shoulder strap fastener buckle or the lap strap fastener system arrests a lower portion of the shoulder strap, whereby the restraint harness becomes tightly secured to the vehicles' seat, such that a back face of the back panel bears against the back rest, preventing forward movement of the occupant.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Attention is first directed to FIGS. 1 to 5 of the drawings, illustrating a an occupant restrainment harness system according to the present disclosure, generally designated 20. The occupant restrainment harness system 20 is configured to be worn by an individual, in particular but not limited, to children of any age competent for sitting at a substantially upright position.

Figure 3:
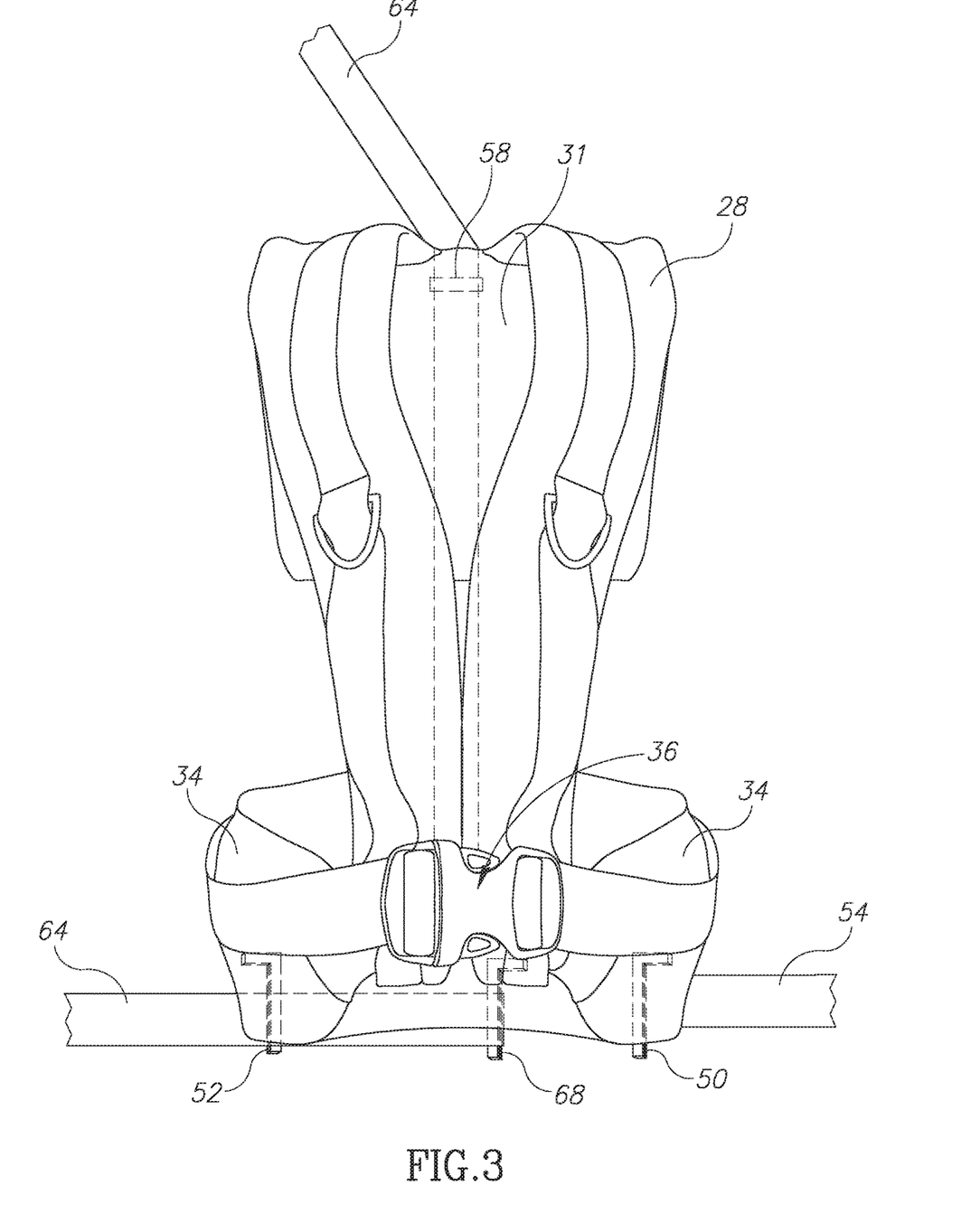
FIG. 3 illustrates the occupant restrainment harness system of FIG. 1 at a closed position.
Figure 4:
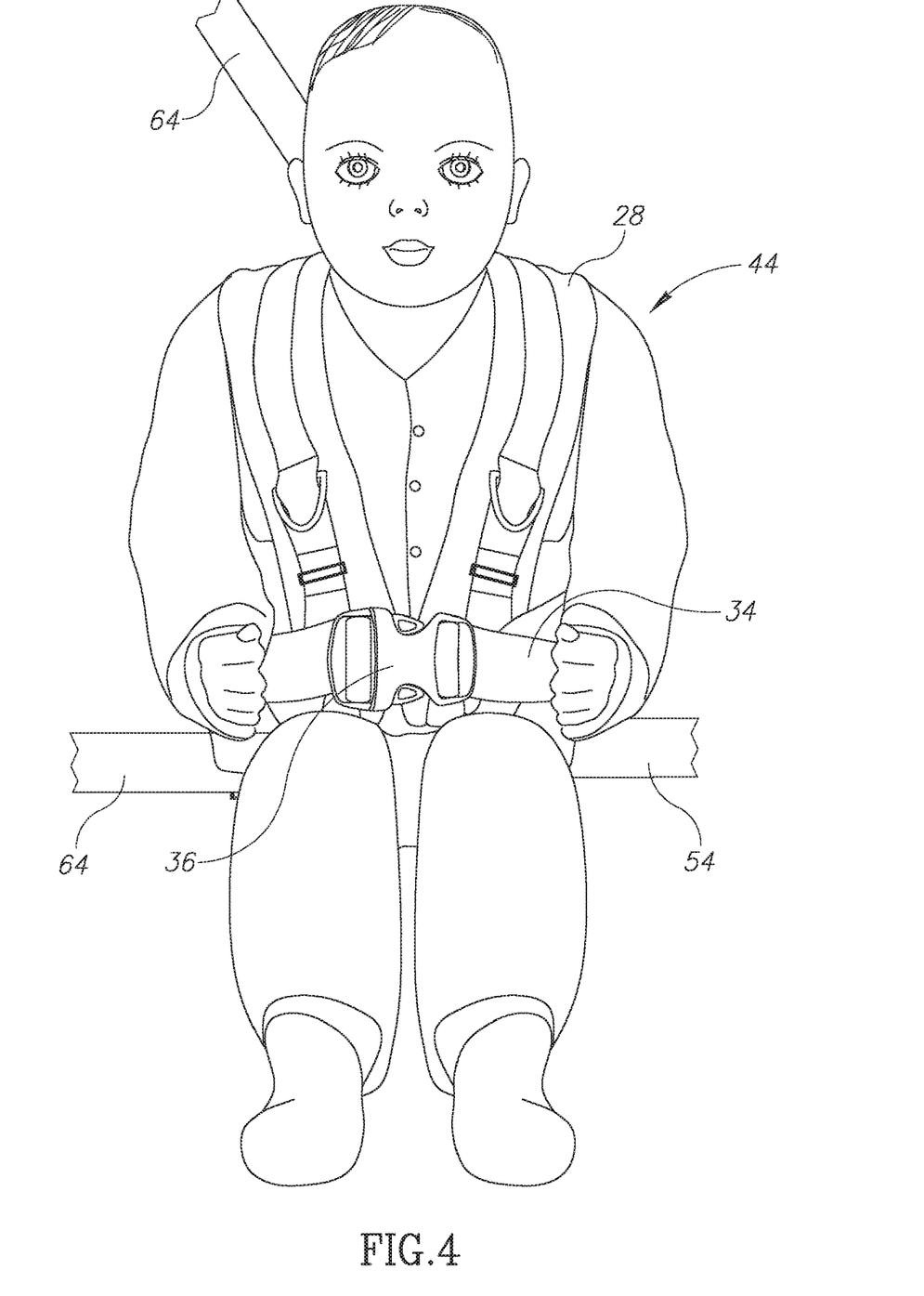
FIG. 4 illustrates the occupant restrainment harness system with a child sitting and occupying the restrainment harness system.

The occupant restrainment harness system 20 is a wearable harness shaped unit, comprising a front panel 24 and a back panel 26, where the front panel 24 is configured with two restraint straps 28 each configured with a length adjusting buckle 30, and a waist strapping 34, also configured with a waist length adjusting and locking buckle (fastener mechanism) 36 (FIG. 3). The rear panel 26 comprises a waist pad 40 (from which extend said waist strapping 34) and a shoulder panel 42 (from which extend the restraint straps 28). The front panel 24 together with the back panel 26 give rise to an occupant torso accommodating space (31 in FIG. 3) configured for comfortably receiving an occupant (e.g. child 44 in FIG. 4). The panels of the occupant restrainment harness system 20 are made of durable, tear and wear resistant material, such as different reinforced fabrics, which are typically padded for comfort and for cushioning in case of impact. At least the front panel can be configured with one or more pouches/pockets useful for storage of personal items (not shown).

Figure 1:
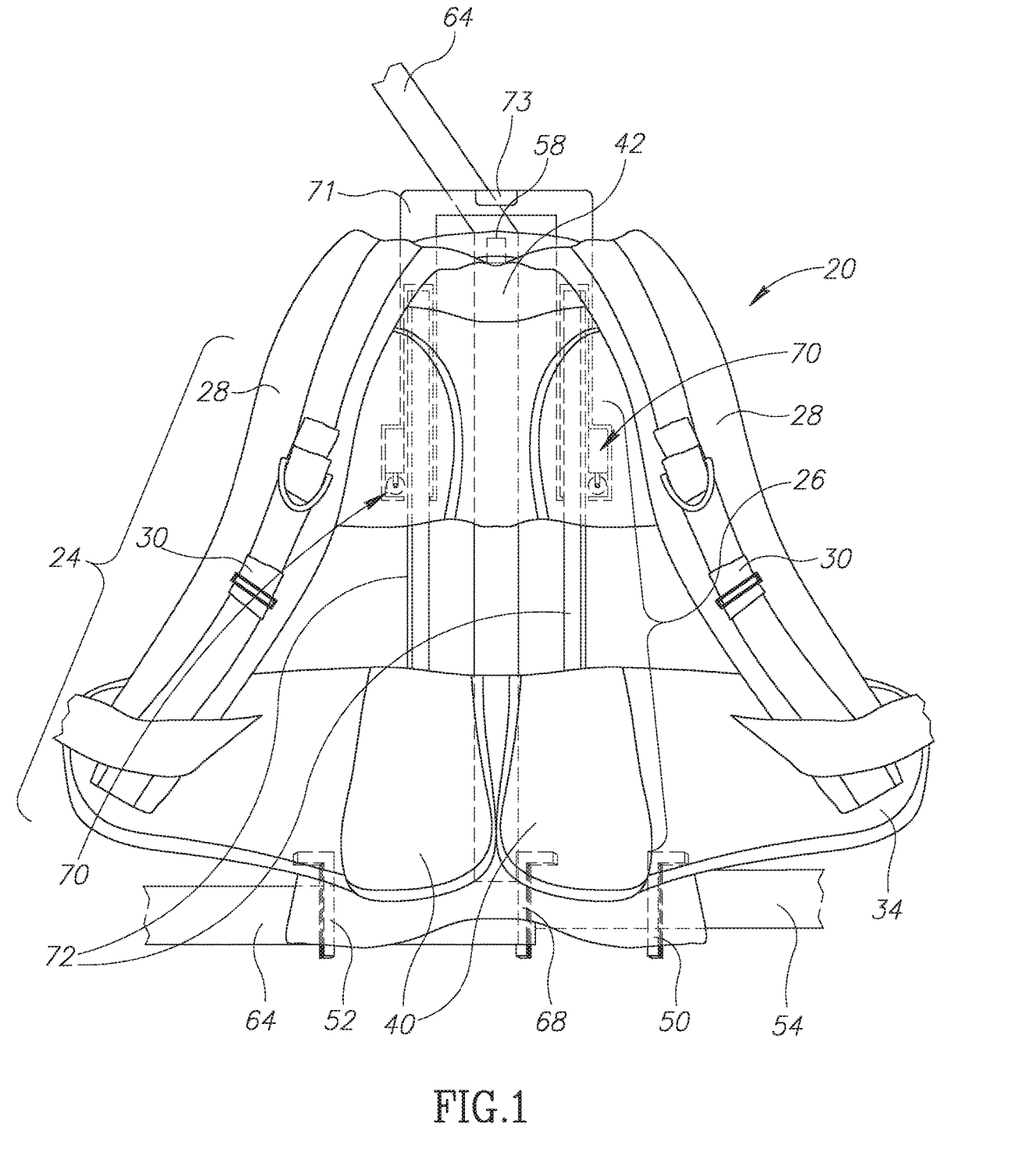
FIG. 1 is a front view of an occupant restrainment harness system superimposed with a vehicle seatbelt system, at an open position.
Figure 2:
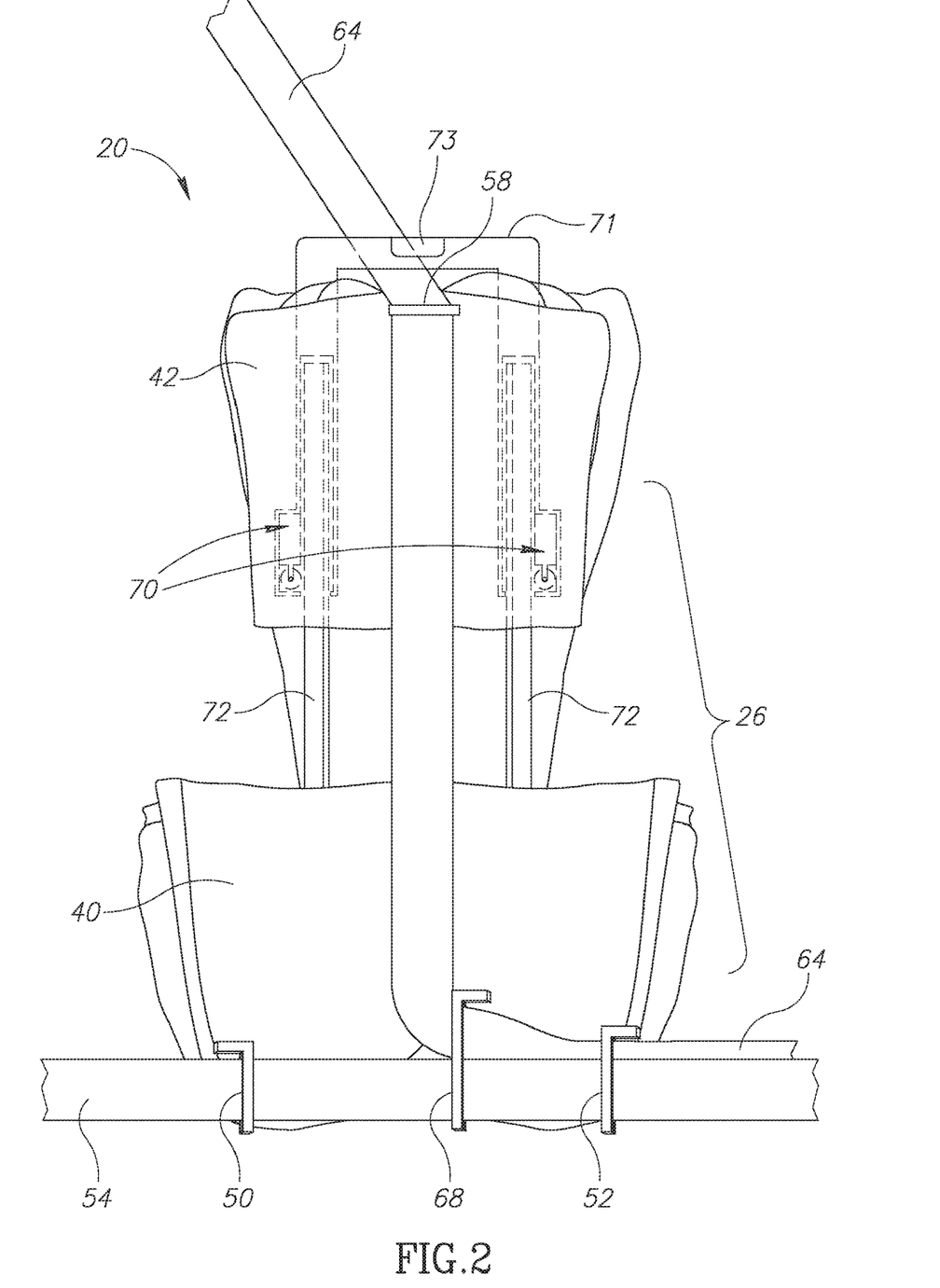
FIG. 2 is a rear view of the restrainment harness system of FIG. 1.

As can be further noted, the back panel 26 is configured at a lower portion of an outside face thereof, namely at waist pad 40, with a lap strap fastener arrangement comprising, in the illustrated example, a left buckle 50 (schematically represented) and a right buckle 52 (schematically represented), together configured for receiving a lap strap 54 of the vehicle seatbelt system (shown in part). The left buckle 50 and the right buckle 52 are disposed symmetrically at a lower portion of the waist pad 40, and are configured for detachably mounting over the lap strap 54, at either a fixed or sliding arrangement, namely where the lap strap 54 can slide through the lap strap fastener arrangement or it can be arrested thereby, however, facilitating removal of the occupant restrainment harness system 20 by opening the buckles.

The shoulder panel 42 of the back panel is configured at an upper portion of the outside face thereof, namely at shoulder panel 42, with a centrally positioned top shoulder strap fastener buckle 58 (schematically represented), and it is noted that the top shoulder strap fastener buckle 58 and the a lap strap fastener arrangement (left buckle 50 and the right buckle 52), are disposed at an isosceles triangle like configuration. The top shoulder strap fastener buckle 58 is however configured for fixed arresting a shoulder strap 64 of the vehicle seatbelt system.

A bottom shoulder strap fastener buckle 68 (schematically represented) is disposed substantially below the top shoulder strap fastener buckle 58, such that the shoulder strap 64 extending between the top shoulder strap fastener buckle 58 and the bottom shoulder strap fastener buckle 68 is forced to extend substantially vertically therebetween (best seen in FIG. 2). However, it is appreciated that the bottom shoulder strap fastener buckle 68 can be a loop slidingly accommodating a respective portion of the shoulder strap 64, or it can fixedly engage therewith (i.e. in a non slideable arrangement). It is also appreciated that both shoulder strap buckles 58 and 68 facilitate detaching from the shoulder strap for removing the occupant restrainment harness from the vehicle.

The arrangement of the occupant restrainment harness of the present disclosure is such that an occupant 44 can easily wear the harness, either when it is secured and engaged with the vehicle seatbelt system, or detached therefrom. Once the harness is worn, the waist length adjusting and locking buckle 36 and the length of the restraint straps 28 are locked and adjusted over the occupant. Either before wearing the restrainment harness system 20 or after, the lap strap fastener arrangement, left buckle 50 and right buckle 52 are arrestingly applied over the lap strap 54 of the vehicle seatbelt system, and the shoulder strap 64 of the vehicle seatbelt system is introduced into the top shoulder strap fastener buckle 58 in a fixed fashion, i.e. where the shoulder strap 64 is arrested and prevented from displacement with respect to the top shoulder strap fastener buckle 58, and then the shoulder strap 64 of the vehicle seatbelt system is introduced through the bottom shoulder strap fastener buckle 68 (either fixed or slidably displaceable therethrough).

Figure 5:
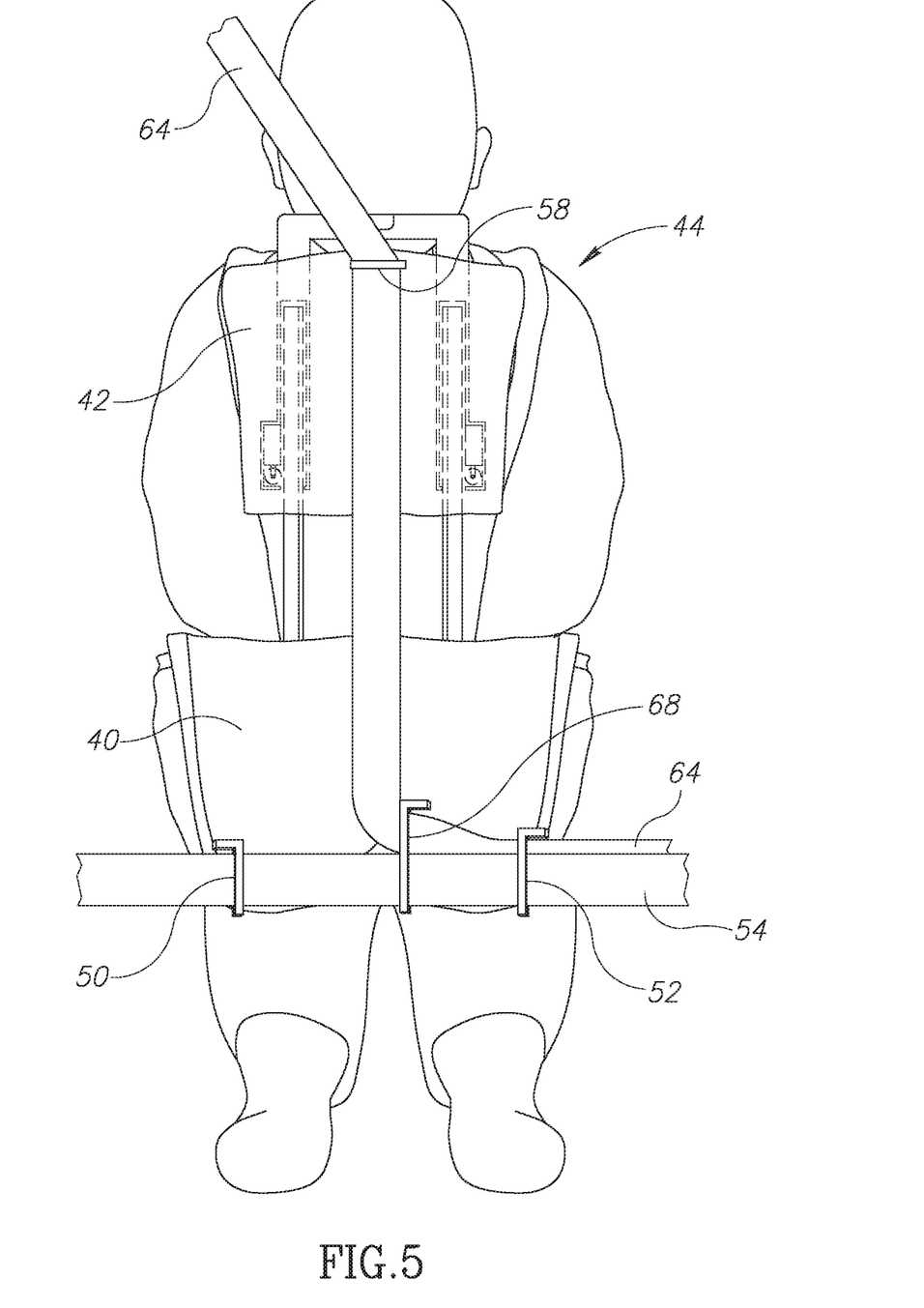
FIG. 5 is a rear view of FIG. 4.

It is seen, best in FIGS. 2 and 5, that at the assembled position, namely when the restrainment harness system 20 is secured to the vehicle seatbelt system, the shoulder strap 64 and the waist strap 54, are disposed at an inverted T-like shape This arrangement thereby facilitates functional operation of the vehicle seatbelt system, namely facilitating tensioning and retraction of the shoulder strap as an occupant 49 using the restrainment harness 20 leans forwards. However, at emergency situations, e.g. at the event of sudden deceleration, rollover, etc. the vehicle seatbelt system functions regularly, namely restrains forward displacement of the harness and the occupant.

Figure 6:
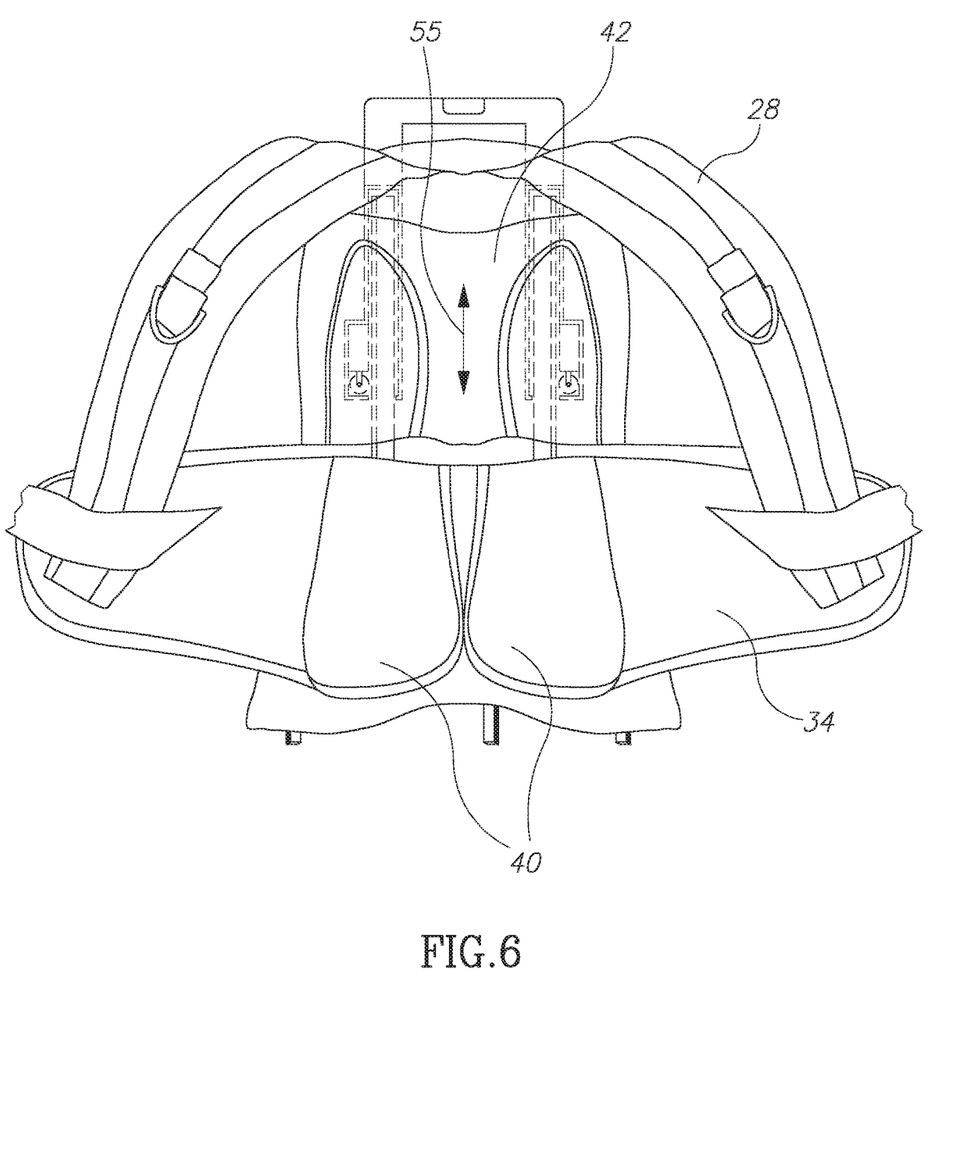
FIG. 6 is a front view illustrating the occupant restrainment harness system with the back panel adjusted to a smaller size.
Figure 7:
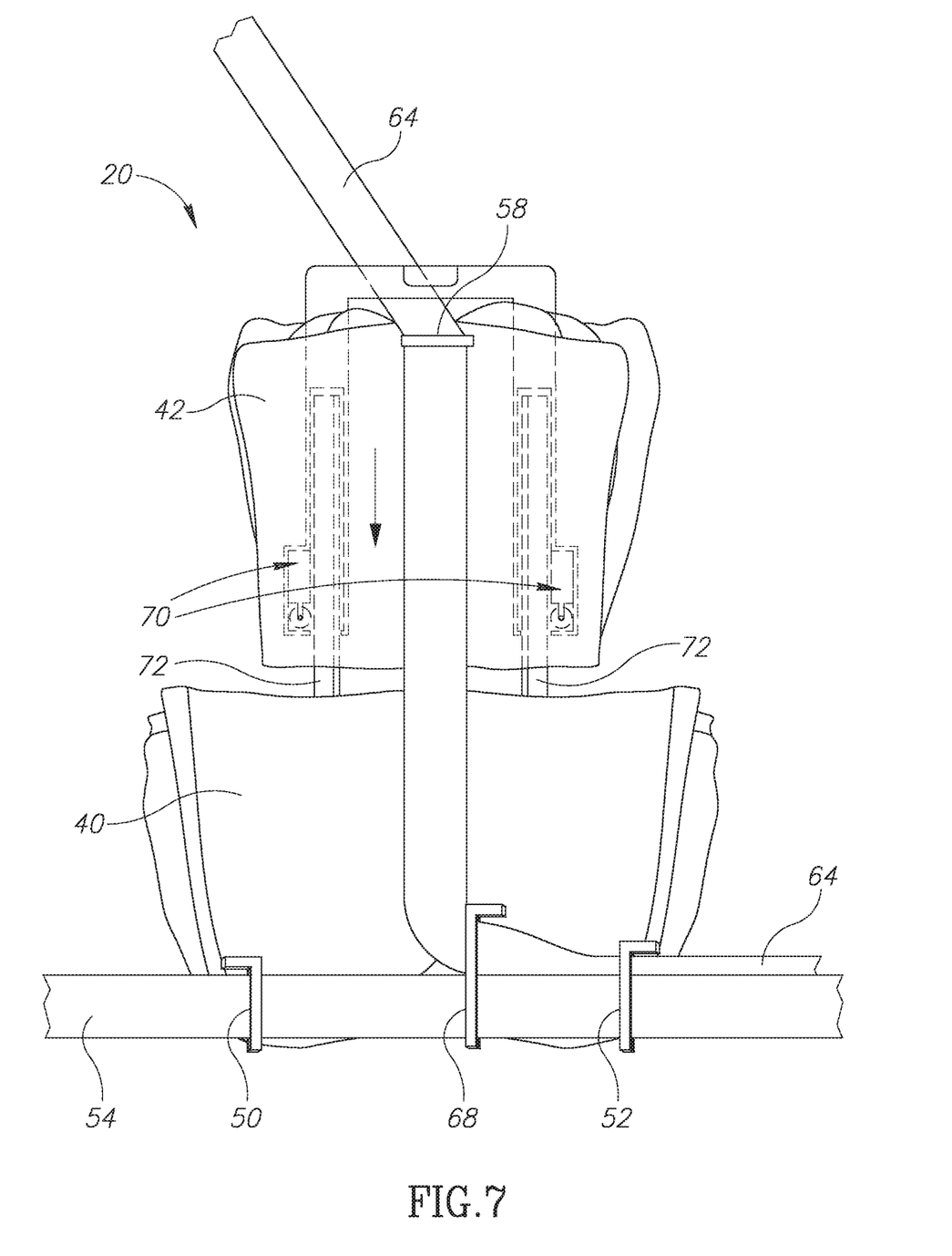
FIG. 7 is a rear view of FIG. 6.

In order to render the occupant restrainment harness system 20 suitable for accommodating occupants of different size, and to optimize safety and comfort of the individual using the system, the system is configured with adjustment features. First, as discussed hereinbefore, the length of restraint straps 28 and the waist strapping 34 can be easily and readily adjusted through the respective buckles. Second, the back panel 26 can be adjusted by displacing the top panel 42 vertically with respect to the lower waist pad 40 (represented by arrowed line 55 in FIG. 6). In FIGS. 6 and 7 the harness system is illustrated at its retracted position and FIGS. 1 and 2 the harness system is illustrated at its expanded position). This is facilitated through a height adjusting mechanism generally designated 70 and comprising a pair of telescopic supports 72, each comprising a first rod member 78 fixedly secured at one end to the top panel 42, and a second rod member 80, telescopically engaged with the first rod member 78 and having an opposite end secured to the lower waist pad 40. The height adjusting mechanism 70 facilitates arresting the top panel 42 at a desired elevation so as to suit with the height of the occupant (which can also be seated over a booster seat).

It is further noted, for example in FIGS. 1 and 2, that the height adjusting mechanism comprises two telescopic rods 72 with a common manipulating mechanism in the form of adjusting handle 71, manipulable through a central knob 73, wherein a single operation of the mechanism governs the height adjusting mechanism associated with each of the rods.

According to a modification of the disclosure (not illustrated), the lap strap fastener arrangement and the top shoulder strap fastener buckle are configured at an inside face of the back panel, however without departing from the principals disclosed hereinabove. According to a particular arrangement, a suitable strap channel is configured at the inside face of the back panel, for accommodating the waist strap and the shoulder strap, with minimal or substantial no interference and inconvenience to an occupant. Even more so, there can be configured a covering arrangement for cushioning the straps and any buckles.

Whilst in FIGS. 1 to 3 the occupant restrainment harness system 20 is illustrated at an extended position (i.e. with the top panel 42 spaced away from the waist pad 40), in FIGS. 6 and 7 the system is illustrated at a retracted position, i.e. (i.e. with the top panel 42 in close proximity with the waist pad 40).

Figure 8A:
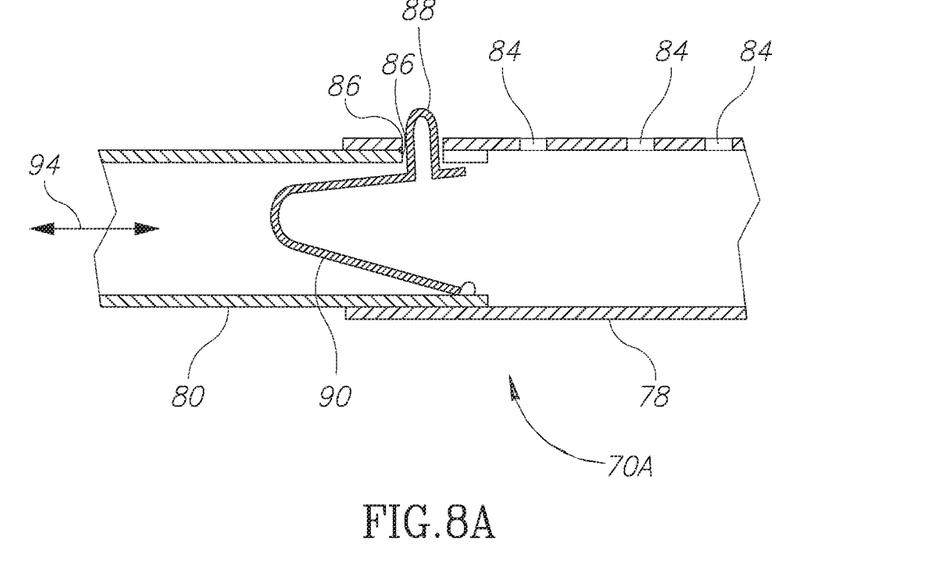
FIGS. 8A and 8B illustrate exemplary height adjusting mechanisms for use with the back panel.
Figure 8B:
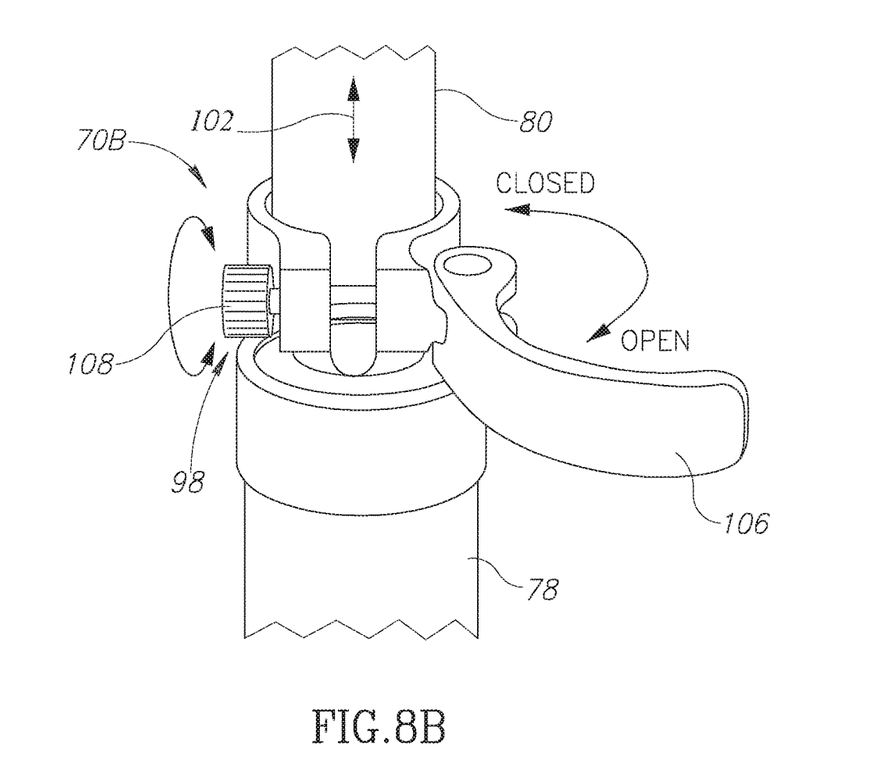

Examples of height adjusting mechanism are illustrated in FIGS. 8A and 8B. Turning first to the example of FIG. 8A the height adjusting mechanism 70A comprises the first (lower) rod member 78 slidingly accommodates the top (second) rod member 80 (or vice versa). The first rod member 78 is configured with a plurality of axially disposed openings 84, one of which being in register with an opening 86 at a bottom end of the second rod member 80, through which projects a push knob 88 fixed over a spring arm 90 which biases the knob 88 to project laterally through the opening 86 and the duty opening 84 of the first rod extending in register therewith. When it is required to adjust the height of the system, the push knob 88 is depressed, facilitating sliding displacement of the second rod member 80 within the first rod member 78 (axially, in direction of arrow 94), until reaching the desired height, whereby the push knob 88 is released allowing it to spontaneously arrest the respective openings.

Yet an example of a height adjusting mechanism 70B is disclosed in FIG. 8B, the height adjusting mechanism 70B comprising the first (lower) rod member 78 slidingly accommodates the top (second) rod member 80 (or vice versa). A fast release locking mechanism 98 is mounted to the first rod member 78, and is configured for clamping over and arresting the top rod member 80 at any axial displacement (axially displaceable in direction of arrow 102). Toggle clamp Lever 106 is used for easy and fast opening/fastening the arresting mechanism, and an adjustment nut 108 is used for adjusting the closure force of the toggle clamp.

Figure 9A:
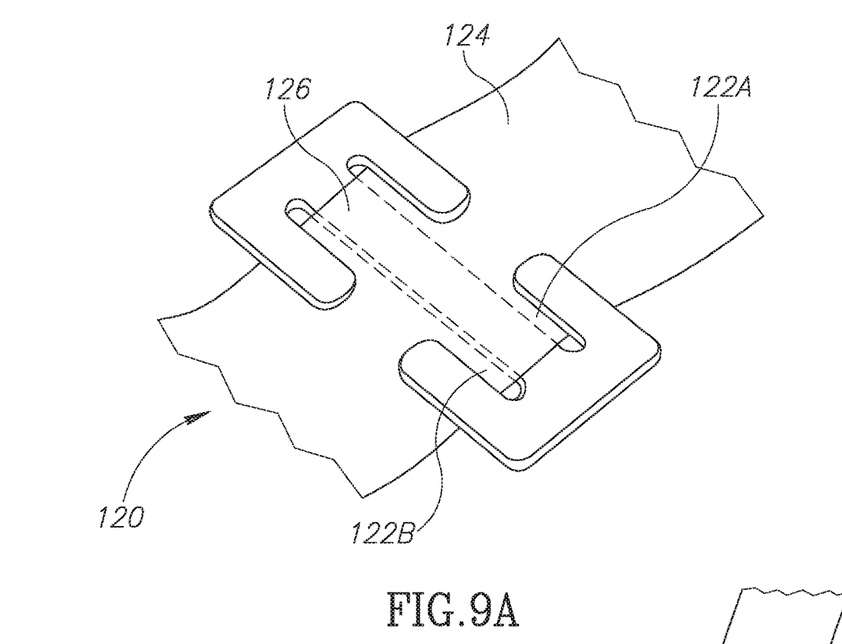
FIGS. 9A to 9C illustrate exemplary strap fastener buckles.
Figure 9B:
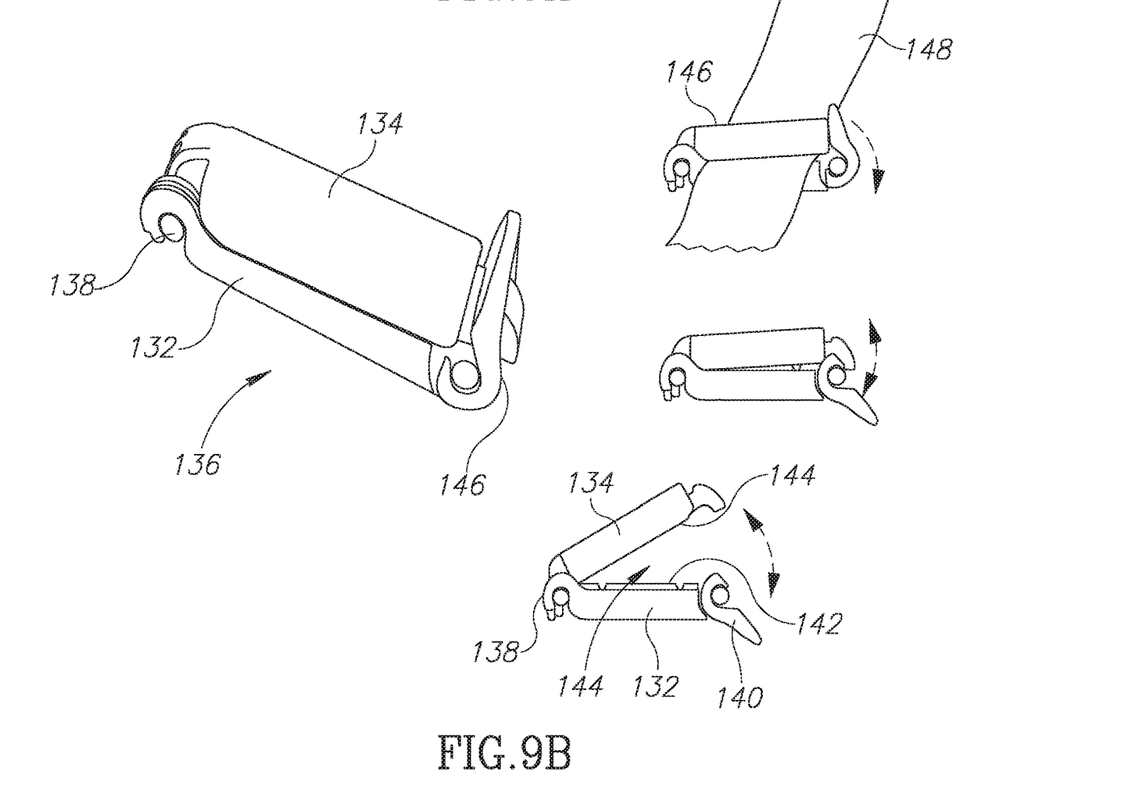
Figure 9C:
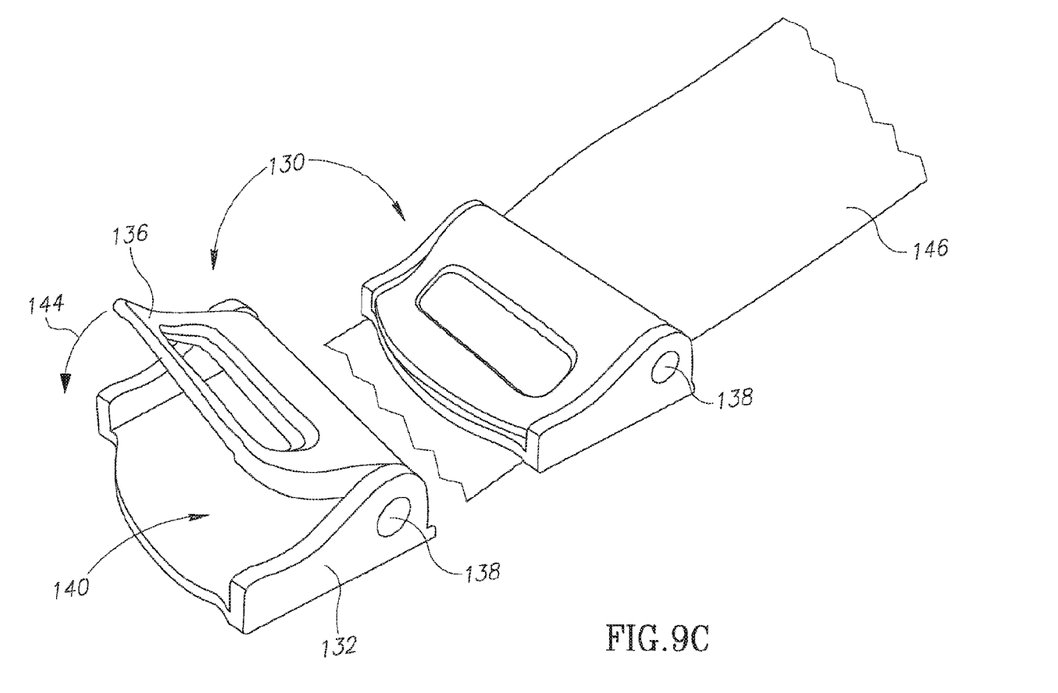

With further attention made to FIGS. 9A to 9C, there are illustrated several examples of strap fastener buckles, in particular buckles configured for arresting a strap, namely suitable for use as a top shoulder strap fastener buckle 58, though can serve also as waist buckles.

The buckle 120 of FIG. 9A is a friction buckle configured with two strap paths 122A and 122B through which the respective strap portion 124 is passed, undulating over a bar portion 126 (illustrated by dashed lines), and which can be secured to the respective panel portion (not shown). Tensioning the strap is facilitated by gradually sliding the strap portion through the buckle, which, however, cannot occur spontaneously, whereby the strap is considered to be fixed with respect to the buckle 120.

In FIG. 9B the is illustrated a different buckle 130, configured as a two-arm clamp buckle, comprising a first arm 132 (securable to the respective panel portion; not shown) and a second arm 134 pivotably secured to the first arm 132 at 138, with a pivotable locking member 140 configured for clamp arresting the two arms to one another. The first arm 132 is configured with a projection ridge 142 facing a corresponding depression 144 at the second arm 134, whereby a strap portion extending through a path 146 extending between the two arms can be fixedly arrested at any desired position, though readily released.

Another example of a fixedly arresting buckle is illustrated in FIG. 9C. the buckle 130 is a clamp-type buckle comprising a base 132 (securable to the respective panel portion; not shown) and a toggle locking lever 136 pivotably articulated at 138 to the base 132 (illustrated at an open position in the left image and at a closed position at the right image). A strap arresting path 140 extends between the base 132 and the locking lever 136, such that locking the buckle 130 by pivotal displacement of the lever 136 in direction of arrow 144 entails clamping arresting of a respective strap portion 146 extending through the path 140.

Figure 10:
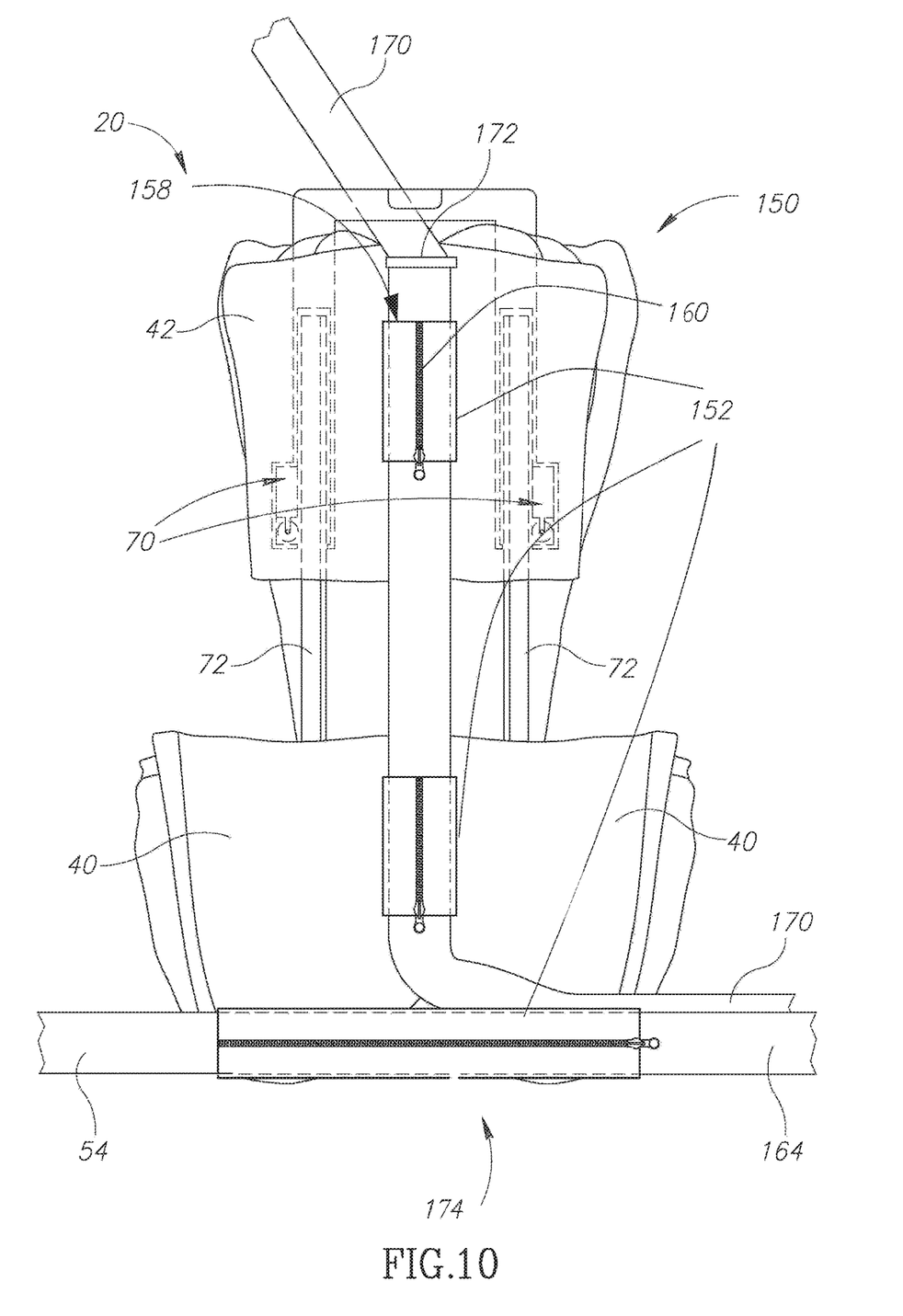
FIG. 10 is a rear view of a restrainment harness system with a different example of strap fastener arrangements.

In FIG. 10 there is illustrated occupant restrainment harness 150, similar to the examples disclosed hereinbefore, however configured with another example of a strap fastener arrangement in the form of a top shoulder strap fastener buckle 172 secured to the base 40 (e.g. stitched to the rear face of the rear panel), and defining a path 158 closable by a fastener arrangement 152 such as a zipper or hock and pile fastener. A respective waist strap portion 164 can be easily and readily closable through the strap fastener arrangement 152 and can be easily removed too.

In the illustrated example of FIG. 10 the shoulder strap 170 extends through a top shoulder strap fastener buckle, schematically represented at 172, and further extends through a sleeve-like securing portion 174 of similar construction as strap fastener arrangement 152 disclosed hereinabove.

Figure 11:
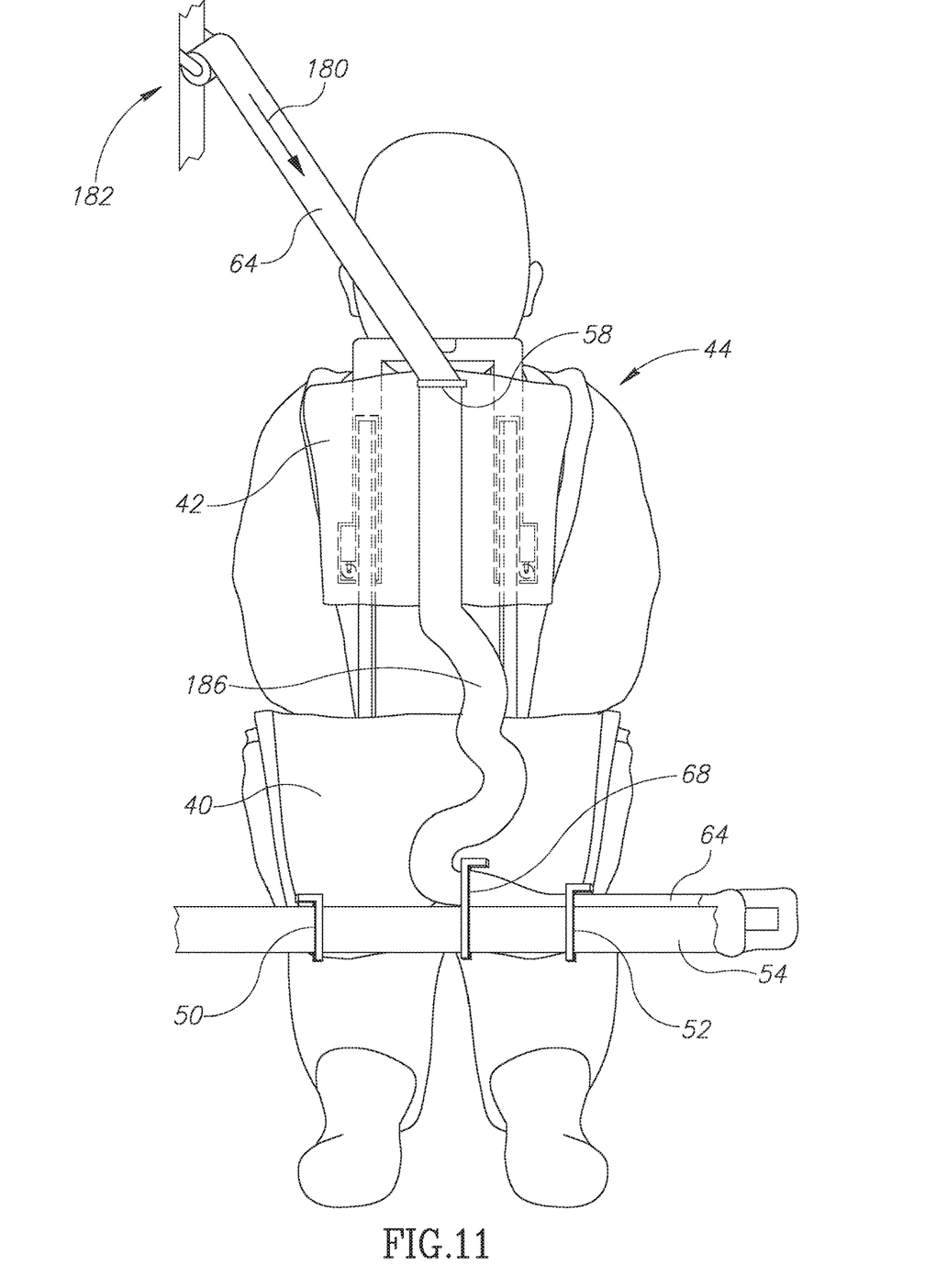
FIG. 11 is a rear view of a child sitting and occupying the restrainment harness system, according to another mounting mode.

Turning now to FIG. 11 of the drawings, there is illustrated a different mode of use of the occupant restrainment harness system 20, according to the disclosure. As can be seen in the drawing, the shoulder strap 64 is fully retracted (i.e. pulled out in direction of arrow 180) from the retractor mechanism 182 (schematically represented at 182), with the top shoulder strap fastener buckle 58 arresting the shoulder strap, and the bottom shoulder strap fastener buckle 68 arresting the shoulder strap below said top shoulder strap fastener buckle 58, leaving a slack shoulder strap portion 186 there between. At this position, the restrainment harness 20 becomes tightly secured to the vehicles' seat (not shown), such that the back face of the back panel 26 bears against the back rest, preventing forward movement of the occupant 44.

The invention claimed is:

1. An occupant restrainment harness configured for use in conjunction with a vehicle seatbelt system, the occupant restrainment harness comprising:
   a back panel and a front panel defining together an occupant torso accommodating space, adjustably closable by a fastener mechanism configured at the front panel;
   wherein the back panel is configured at a lower portion thereof with a lap strap fastener arrangement configured for receiving a lap strap of the vehicle seatbelt system, and a top shoulder strap fastener buckle configured for fixed arresting a shoulder strap of the vehicle seatbelt system and preventing a sliding displacement of the shoulder strap with respect thereto, and being centrally positioned at a top portion of the back panel;
   wherein the back panel is configured at a bottom portion thereof, with a bottom shoulder strap fastener buckle, extending substantially below the top shoulder strap fastener buckle.

2. The occupant restrainment harness of claim 1, wherein the back panel has an adjustable height.

3. The occupant restrainment harness of claim 1, wherein the top shoulder strap fastener buckle is configured for facilitating detaching from the shoulder strap for removing the occupant restrainment harness from the vehicle.

4. The occupant restrainment harness of claim 1, wherein the bottom shoulder strap fastener buckle is a loop slidingly accommodating a respective portion of the shoulder strap, or it can fixedly engage therewith.

5. The occupant restrainment harness of claim 1, wherein the lap strap is fixedly arrested or slidably received by the by the lap strap fastener arrangement.

6. The occupant restrainment harness of claim 1, wherein the lap strap fastener arrangement is one or more loop buckles, or sleeve-like portions extending across a bottom portion of the back panel, for slidably accommodating respective portions of the lap strap of the vehicle seatbelt system.

7. The occupant restrainment harness of claim 1, wherein the lap strap fastener arrangement is configured with a closure arrangement facilitating removable mounting over the respective portions of the lap strap of the vehicle seatbelt system.

8. The occupant restrainment harness of claim 1, wherein the lap strap fastener arrangement is positioned at a waist portion of the back panel.

9. The occupant restrainment harness of claim 1, wherein the lap strap fastener arrangement is configured with at least two closure arrangements, each disposed at a respective side portion of the back panel.

10. The occupant restrainment harness of claim 1, wherein the lap strap fastener arrangement is configured with at least two equi-leveled closure arrangements.

11. The occupant restrainment harness of claim 1, wherein the height of the top shoulder strap fastener buckle is readily adjustable over the back panel.

12. The occupant restrainment harness of claim 1, wherein the fasteners at the back panel, are configured for attachable detachable fastening to the vehicle's seatbelt system, and whereby the restrainment harness can be readily removed and reattached thereto.

13. The occupant restrainment harness of claim 1, wherein the front panel and the back panel of the occupant restrainment harness are separate panels articulated to one another by side portions.

14. The occupant restrainment harness of claim 1, wherein the front panel includes two or more restraint straps.

15. The occupant restrainment harness of claim 1, wherein the top shoulder strap fastener buckle is configured such that the top shoulder strap fastener buckle arrests the respective portion of the shoulder strap and will not spontaneously slide thereover, though configured for detachable arresting.

16. The occupant restrainment harness of claim 1, wherein the back panel includes a waist panel and one or more shoulder panels articulated to one another.

17. The occupant restrainment harness of claim 1, wherein the shoulder strap extends substantially vertical when arrested by the top shoulder strap fastener buckle and the bottom shoulder strap fastener buckle.

* * * * *